United States Patent [19]
Esaki

[11] Patent Number: 6,133,900
[45] Date of Patent: Oct. 17, 2000

[54] OSD DEVICE CAPABLE OF MAINTAINING THE SIZE OF DISPLAYED OSD DATA AT A CONSTANT IN A MULTISYNC MONITOR REGARDLESS OF A FREQUENCY OF A HORIZONTAL SYNCHRONOUS SIGNAL

[75] Inventor: Takafumi Esaki, Kanagawa, Japan

[73] Assignee: NEC Corporation, Tokyo, Japan

[21] Appl. No.: 08/971,962

[22] Filed: Nov. 17, 1997

[30] Foreign Application Priority Data

Nov. 15, 1996 [JP] Japan .................................. 8-304726

[51] Int. Cl.[7] .................................................. H04N 5/44
[52] U.S. Cl. ................................... 345/127; 345/133
[58] Field of Search .................................. 345/127, 128, 345/131, 132, 133; D45/134, 136, 141, 147, 339, 326, 333, 338; 348/511, 589; 375/376

[56] References Cited

U.S. PATENT DOCUMENTS

| | | | |
|---|---|---|---|
| 4,962,427 | 10/1990 | Lunn et al. | 358/188 |
| 4,962,428 | 10/1990 | Tong et al. | 358/188 |
| 5,436,668 | 7/1995 | Tults | 348/536 |
| 5,459,766 | 10/1995 | Huizer et al. | 375/376 |
| 5,579,057 | 11/1996 | Banker et al. | 348/589 |
| 5,673,087 | 9/1997 | Choi et al. | 348/511 |
| 5,801,789 | 9/1998 | Zeidler et al. | 348/589 |
| 5,900,913 | 5/1999 | Tults | 348/468 |
| 5,982,239 | 11/1999 | Takahashi et al. | 331/11 |

FOREIGN PATENT DOCUMENTS

| | | |
|---|---|---|
| 5-80736 | 4/1993 | Japan . |
| 5-344440 | 12/1993 | Japan . |
| 6-85631 | 3/1994 | Japan . |

*Primary Examiner*—Steven Sax
*Attorney, Agent, or Firm*—Foley and Lardner

[57] ABSTRACT

An OSD clock generating circuit includes a PPL circuit controlled to oscillate to generate an OSD clock signal phase-locked with a level transition point of a horizontal synchronous signal. When an OSD device is used in a multisync monitor capable of changing its horizontal synchronous signal frequency, an OSD data can be displayed with the same size without being influenced by a change of the frequency of the horizontal synchronous signal.

6 Claims, 5 Drawing Sheets

OSD DEVICE CAPABLE OF MAINTAINING THE SIZE OF DISPLAYED OSD DATA AT A CONSTANT IN A MULTISYNC MONITOR REGARDLESS OF A FREQUENCY OF A HORIZONTAL SYNCHRONOUS SIGNAL

BACKGROUND OF THE INVENTION

1. Field of the Invention

The present invention relates to an "on-screen display" device, and more specifically to an "on-screen display" device for generating and controlling an "on-screen display" which indicates, for example, a time, a channel number and the like, on a display screen of a multisync monitor display so configured that the frequency of an input horizontal synchronous signal can be changed. In this specification, the "on-screen display" is abbreviated to "OSD".

2. Description of Related Art

In a personal computer and in a television receiver, the OSD device has been widely used as an information display means for visually indicating a time, a control panel, the channel number of a channel being received, a sound volume, etc.

Reflecting a recent multimedia generation, on the other hand, a multisync monitor capable of changing the input horizontal synchronous signal frequency to be able to satisfy various different display commands, has been widely used as a display means.

Referring to FIG. 1, there is shown a block diagram of one example of the prior art OSD device used in combination with the multisync monitor. The shown prior art OSD device includes an oscillating circuit 8 constituted of an LC oscillating circuit and configured to start to oscillate in synchronism with a rising edge of a horizontal synchronous signal H separated from an input composite video signal (not shown) to generate an OSD clock CK for a character display, and a character synthesizing circuit 3 controlled by the OSD clock CK, the horizontal synchronous signal H, a vertical synchronous signal V and a control signal CM supplied from a microcomputer (not shown), for generating an OSD display data OD.

The oscillating circuit 8 includes a NAND circuit 81 having a first input connected to receive the horizontal synchronous signal H, a tuning coil L31 connected between an output and a second input of the NAND circuit 81, a capacitor C31 connected between the second input of the NAND circuit 81 and ground, and another capacitor C32 connected between the output of the NAND circuit 81 and the ground. The output of the NAND circuit 81 generates the OSD clock CK.

Now, an operation of the shown prior art OSD device will be described with reference to FIGS. 2A and 2B, which are timing charts illustrating different operation situations of the prior art OSD device shown in FIG. 1.

The oscillating circuit 8 starts to oscillate in synchronism with the rising edge of the horizontal synchronous signal H, and the oscillation frequency is determined by a time constant determined by the coil L31 and the capacitor C31. The OSD clock CK having the oscillation frequency thus determined is supplied to the character synthesizing circuit 3. The character synthesizing circuit 3 controls a vertical direction display of the OSD character display by counting the horizontal synchronous signal H using the vertical synchronous signal V as a reference, and also controls a horizontal direction display of the OSD character display by counting the OSD clock CK using the horizontal synchronous signal H as a reference, thereby to set a vertical direction timing and a horizontal direction timing of the OSD display data OD.

When the OSD data such as characters and/or the like outputted from the OSD device is displayed on a monitor screen, a reference size in the horizontal direction is determined by a ratio of the period of the OSD clock CK to the period of the horizontal synchronous signal H.

Referring to FIGS. 2A and 2B, again, it is assumed that two different horizontal synchronous signals H1 and H2 having different periods T1 and T2, respectively, are supplied, and clocks CK1 and CK2 generated in response to the horizontal synchronous signals H1 and H2, respectively, have periods T5 and T6, respectively. In this assumption, the reference sizes of the same character displayed in two different situations, become T5/T1 and T6/T2, respectively. Here, it is also assumed that the periods T1 and T2 of the horizontal synchronous signals H1 and H2 has a relation of T1=2×T2. On the other hand, the clocks CK1 and CK2 generated in the oscillating circuit 8 have the same frequency, namely, the same period (T5=T6). Accordingly, the reference sizes of the displayed character become T6/(2×T2) and T6/T2, respectively. Namely, the character displayed in one situation in that the horizontal synchronous signal H2 is used, has twice the size of the same character displayed in the other situation in that the horizontal synchronous signal H1 is used. Assuming that the character displayed in the one situation has an appropriate size, the character displayed in the other situation is difficult to read.

When the prior art OSD device mentioned above is used in the multisync monitor having the input horizontal synchronous signal of the variable frequency, the horizontal direction reference size of the OSD data such as characters and/or the like outputted from the OSD device is determined by the ratio of the period of the OSD clock CK to the period of the horizontal synchronous signal H. Therefore, generally speaking, when two different synchronizable horizontal synchronous signals have a period relation that one has N times the period of the other where "N" is an integer not less than 2, since the generated OSD clocks have the same period, the size of the OSD data displayed on the basis of one of the two horizontal synchronous signals is N times the size of the OSD data displayed on the basis of the other horizontal synchronous signal. If the larger OSD data has an appropriate size, the other OSD data, namely, the smaller OSD data is very difficult to read.

SUMMARY OF THE INVENTION

Accordingly, it is an object of the present invention to provide an OSD device which has overcome the above mentioned defect of the conventional one.

Another object of the present invention is to provide an OSD device capable of maintaining the size of displayed OSD data at a constant when the OSD data is displayed in a multisync monitor having an input horizontal synchronous signal of a variable frequency.

The above and other objects of the present invention are achieved in accordance with the present invention by an OSD device comprising a clock generating circuit for generating, in synchronism with a horizontal synchronous signal obtained from a composite video signal, an OSD clock signal for displaying an on-screen display which is an auxiliary display including a character to be added on an image based on the composite video signal, and an OSD synthesizing circuit receiving the OSD clock signal, the horizontal synchronous signal, a vertical synchronous signal obtained from the composite video signal, and a first control signal, for generating an OSD display data, the clock generating circuit including a PLL circuit controlled to oscillate to generate the OSD clock signal phase-locked with a level transition point of the horizontal synchronous signal.

The above and other objects, features and advantages of the present invention will be apparent from the following description of preferred embodiments of the invention with reference to the accompanying drawings.

DESCRIPTION OF THE PREFERRED EMBODIMENTS

Figure 3:
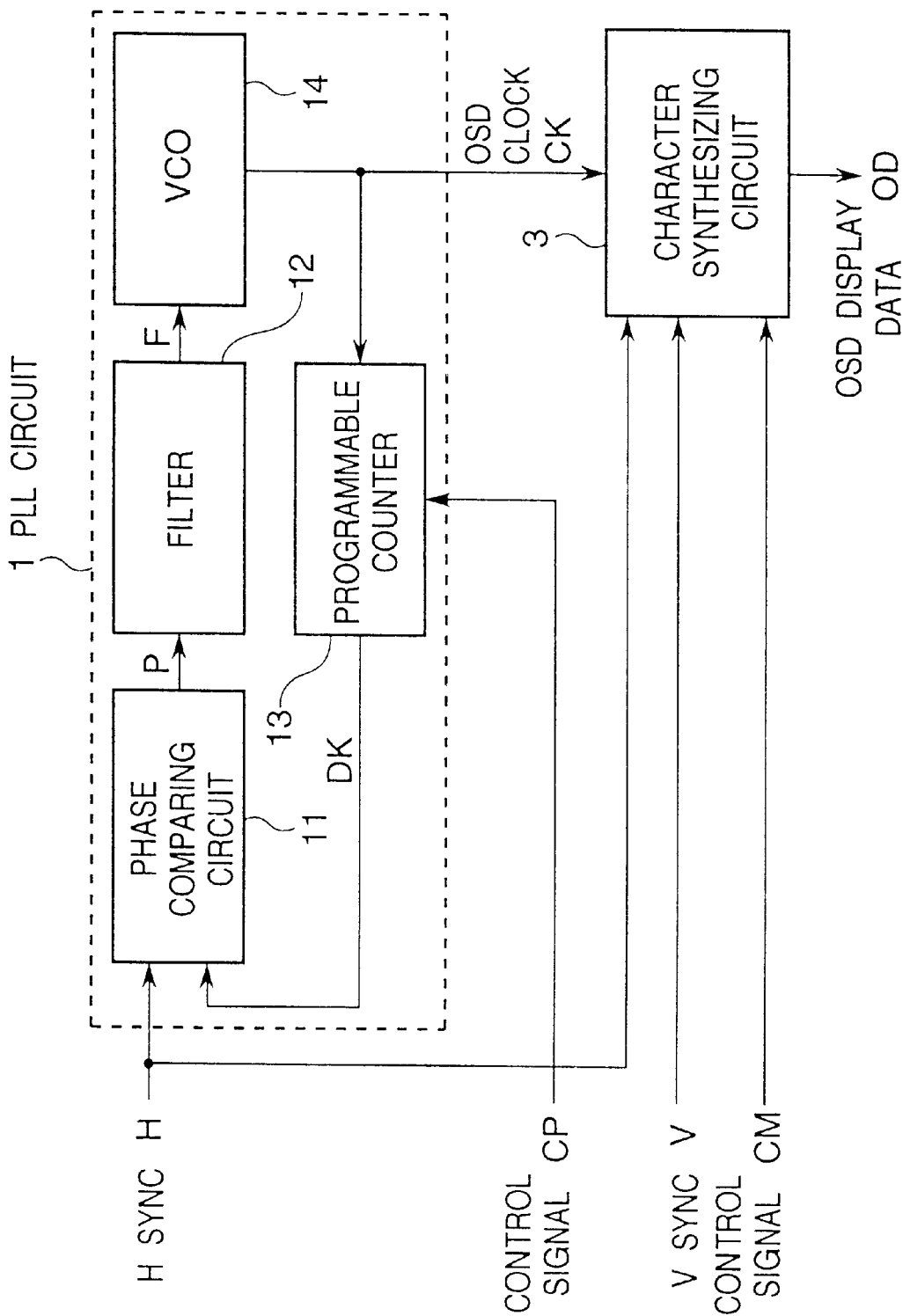
FIG. 3 is a block diagram of a first embodiment of the OSD device in accordance with the present invention.

Referring to FIG. 3, there is shown a block diagram of a first embodiment of the OSD device in accordance with the present invention. In FIG. 3, elements similar to those shown in FIG. 1 are given the same Reference Numerals and Signs, and explanation thereof will be omitted for simplification of description.

Figure 1:
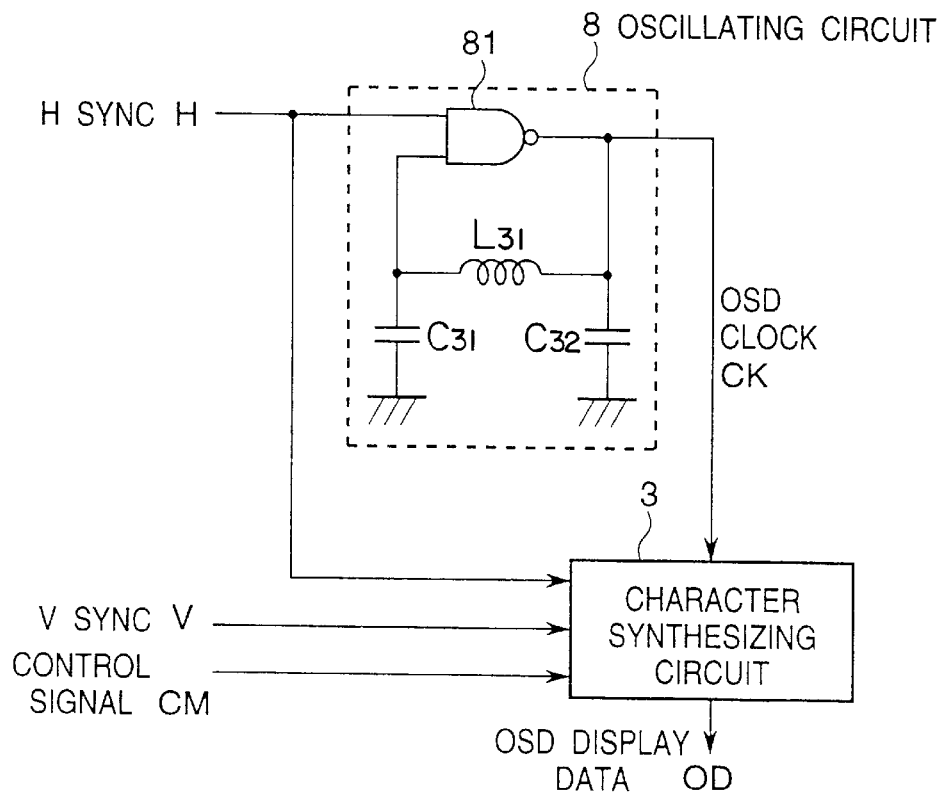
FIG. 1 is a block diagram of one example of the prior art OSD device used in combination with the multisync monitor.
Figure 2A:
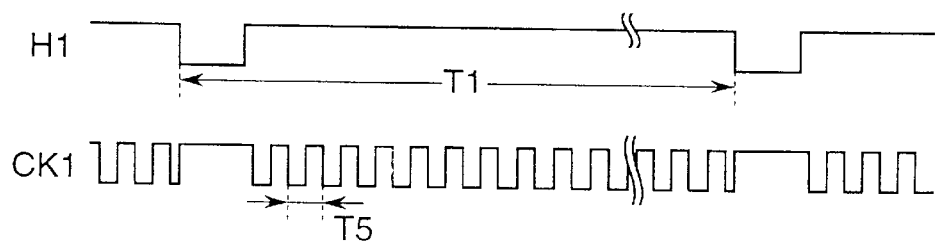
FIGS. 2A and 2B are timing charts illustrating different operation situations of the prior art OSD device shown in FIG. 1.
Figure 2B:
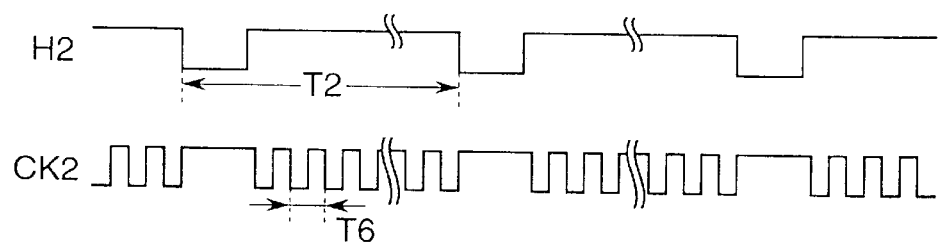

As seen from comparison between FIGS. 1 and 3, the shown embodiment includes the character synthesizing circuit 3 similar to that of the prior art example, and a PLL (phase-locked loop) circuit 1 generating an OSD clock CK which is phase-locked with the rising edge of the input horizontal synchronous signal H and has a frequency controlled by a control signal CP supplied from a microcomputer (not shown).

The PLL circuit 1 includes a phase comparing circuit 11 comparing the input horizontal synchronous signal H and a frequency-divided signal DK for generating a phase difference signal P, a filter 12 receiving and smoothing the phase difference signal P to generate an oscillation control signal F, a voltage controlled oscillator 14 receiving the oscillation control signal F for generating an OSD clock CK having a frequency controlled by the voltage of the oscillation control signal F, and a programmable counter 13 receiving the OSD clock CK for frequency-dividing the OSD clock CK by a frequency-dividing ratio set by the control signal CM, so as to generate the frequency-divided signal DK.

Now, a general operation of the first embodiment of the OSD device will be described with reference to FIG. 3. The PLL circuit 1 receives the horizontal synchronous signal H to generate the OSD clock CK phase-locked with the horizontal synchronous signal H, and the OSD clock CK is supplied to the character synthesizing circuit 3. Similarly to the prior art example, the character synthesizing circuit 3 receives the OSD clock CK, the horizontal synchronous signal H, the vertical synchronous signal V and the control signal CM, and controls a vertical direction display of the OSD data by counting the horizontal synchronous signal H using the vertical synchronous signal V as a counting reference, and also controls a horizontal direction display by counting the OSD clock CK using the horizontal synchronous signal H as a counting reference, thereby to set a vertical direction timing and a horizontal direction timing of the OSD display data OD.

Next, an operation of the PLL circuit 1 will be described with reference to FIGS. 4A and 4B, which are timing charts illustrating difference operation situations of the OSD device shown in FIG. 3.

Figure 4A:
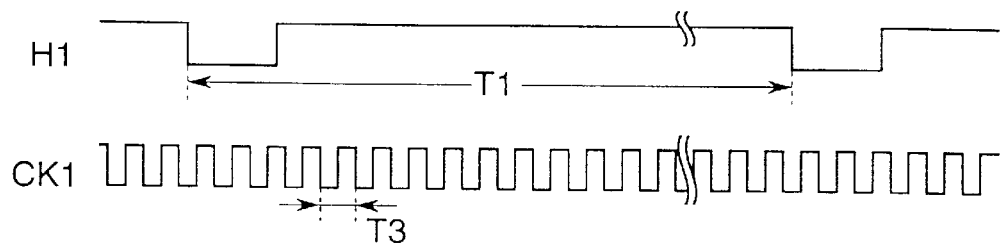
FIGS. 4A and 4B are timing charts illustrating different operation situations of the OSD device shown in FIG. 3.

First, as shown in FIG. 4A, when a first horizontal synchronous signal H1 has a period T1, the period T3 of the OSD clock CK outputted from the PLL circuit 1 is determined by the frequency-dividing ratio of the programmable counter 13 set by the control signal CP. Here, assuming that the frequency-dividing ratio of the programmable counter 13 is "n" which is a natural number, the period T3 can be expressed as T1/n.

Figure 4B:
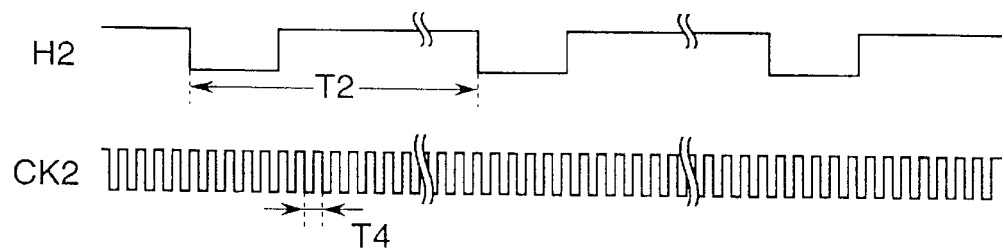

Next, consider that, a second horizontal synchronous signal H2 having a period T2 different from the period T1 of the first horizontal synchronous signal H1, as shown in FIG. 4B, is supplied. At this time, if it is assumed that the period of the OSD clock CK2 generated in response to the second horizontal synchronous signal H2 is T4, the period T4 of the OSD clock C2 is expressed as T2/n. Namely, if the frequency-dividing ratio "n" is at a constant, the period of the OSD clock CK varies dependently upon the period of the horizontal synchronous signal H, but a ratio of the period of the OSD clock CK to the period of the horizontal synchronous signal H is maintained at a constant. On the other hand, the preference for the displayed size of the character supplied from the OSD device is the ratio of the period of the OSD clock CK to the period of the horizontal synchronous signal H. Therefore, even if the period of the horizontal synchronous signal H varies, the size of the OSD displayed character does not change, with the result that the size of the OSD displayed character can be maintained in an easily readable size.

Figure 5:
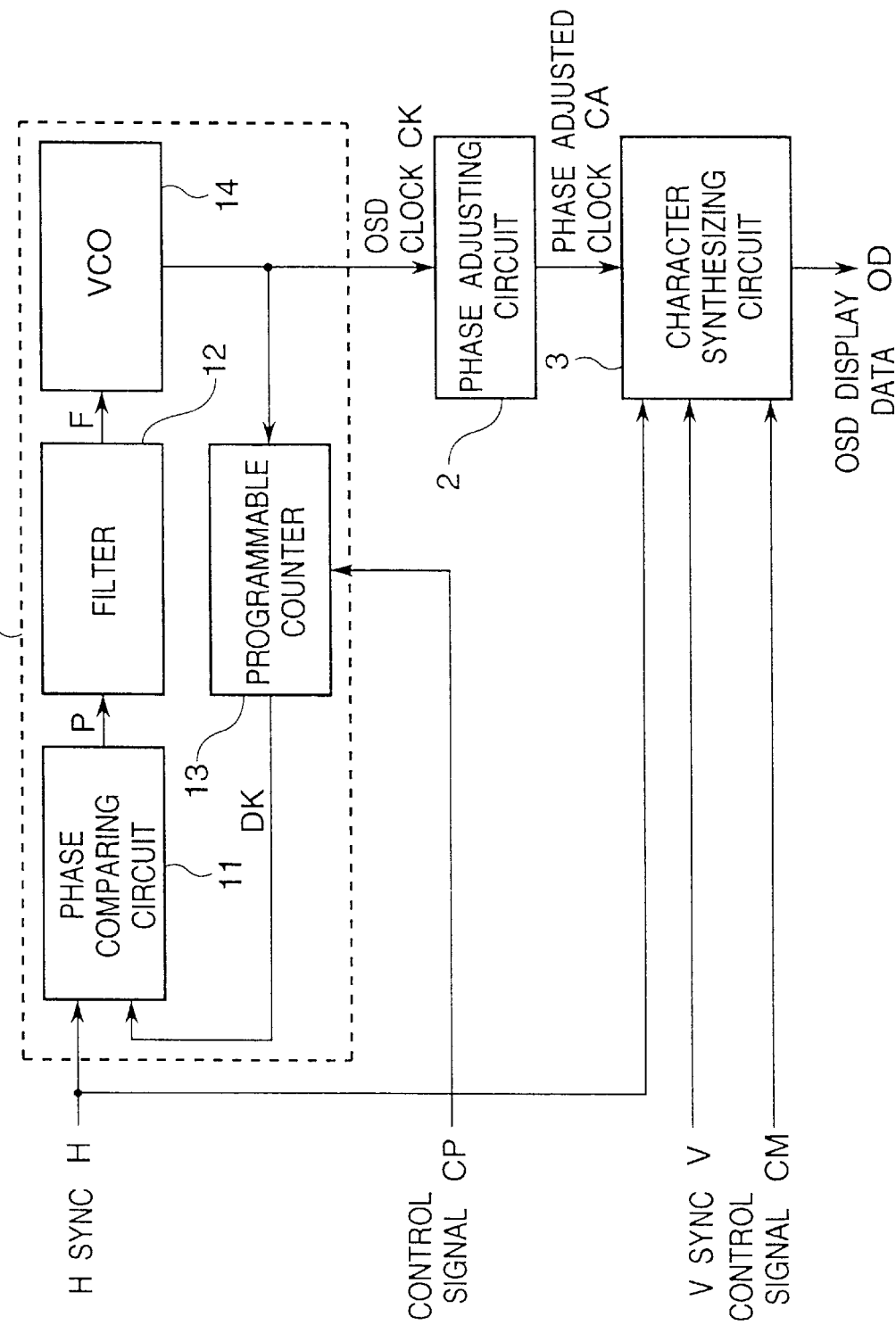
FIG. 5 is a block diagram of a second embodiment of the OSD device in accordance with the present invention.

Referring to FIG. 5, there is shown a block diagram of a second embodiment of the OSD device in accordance with the present invention. In FIG. 5, elements similar to those shown in FIG. 3 are given the same Reference Numerals and Signs, and explanation thereof will be omitted for simplification of description.

As seen from comparison between FIGS. 3 and 5, the second embodiment is different from the first embodiment in that the second embodiment includes a phase adjusting circuit 2 located between the PLL circuit 1 and the character synthesizing circuit 3, for delaying the OSD clock CK outputted from the PLL circuit 1, by a predetermined time, to generate a phase-adjusted clock CA having an optimized phase relation to the rising edge of the horizontal synchronous signal H.

Figure 6:
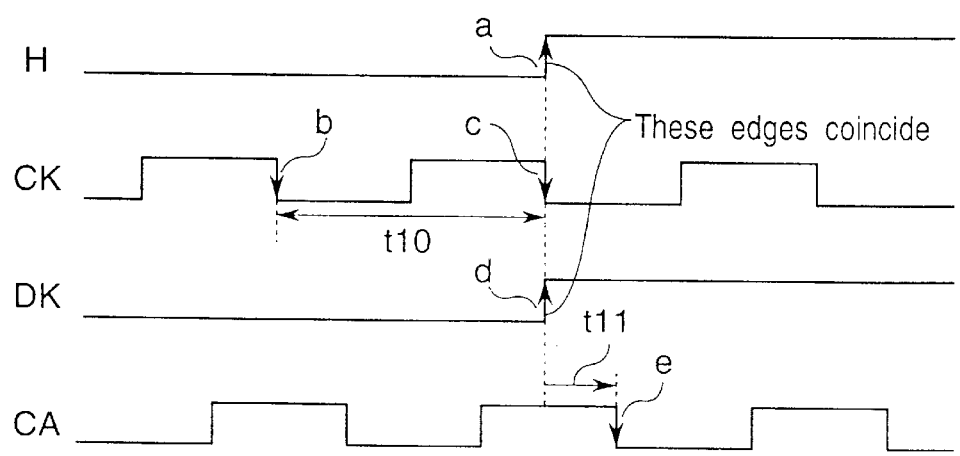
FIG. 6 is a timing chart illustrating an operation of the OSD device shown in FIG. 5.

Now, an operation of the second embodiment will be described with reference to FIG. 5 and FIG. 6 which is a time-expanded timing chart illustrating the horizontal synchronous signal H, the frequency-divided signal DK and the clocks CK and CA in the neighborhood of the rising edge of the horizontal synchronous signal H.

As mentioned above, the PLL circuit 1 operates to make the rising edge "a" of the horizontal synchronous signal H and the rising edge "d" of the frequency-divided signal DK coincident with each other in phase. On the other hand, since the frequency-divided signal DK is obtained by frequency-dividing the OSD clock CK by the programmable counter 13, a delay time t10 attributable to the programmable counter 13 inevitably exists between a level transition point of the OSD clock CK which becomes a counting point, namely, the falling edge "b" of the OSD clock CK, and the rising edge "d" of the frequency-divided signal DK. In some case, this delay time t10 is coincident with the period of the OSD clock CK, with the result that the rising edge "a" of the horizontal synchronous signal H is coincident with the next falling edge "c" (relevant edge) of the OSD clock CK which becomes as the counting point.

In this situation, if the OSD clock CK is supplied, as it ts, to the character synthesizing circuit 3, the character synthesizing circuit 3 starts to count the OSD clock CK from the rising edge "a" of the horizontal synchronous signal H. As a result, the character synthesizing circuit 3 counts the relevant edge "c" of the OSD clock CK in one case and does not count in another. Therefore, a horizontal reference point of the display character deviates in different horizontal scans, so that fluctuation of the display character occurs.

In order to avoid the above mentioned inconvenience, in the second embodiment, the phase adjusting circuit 2 adds a delay time t11 to the received OSD clock CK to generate the phase-adjusted output clock CA having a falling edge "e" which is never coincident with the rising edge "a" of the horizontal synchronous signal H.

Figure 7A:
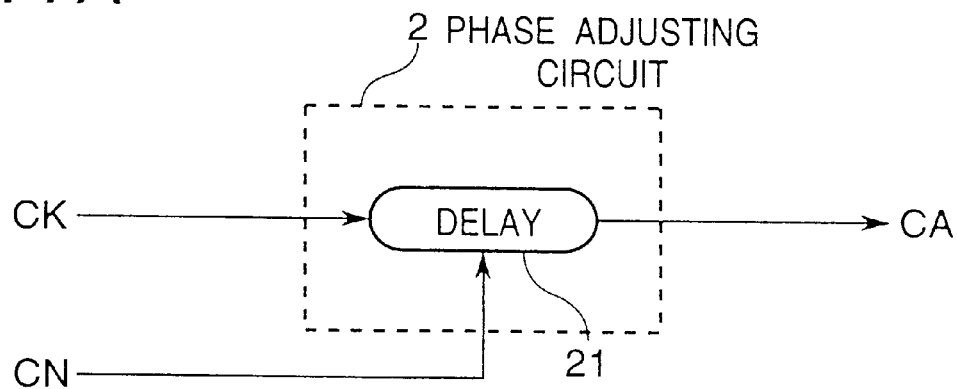
FIG. 7A is a circuit diagram of the phase adjusting circuit included in the OSD device shown in FIG. 5.

Referring to FIG. 7A, there is shown a circuit diagram of the phase adjusting circuit 2 included in the OSD device shown in FIG. 5. The shown phase adjusting circuit 2 includes a delay circuit 21 receiving the OSD clock CK and controlled by a control signal CN supplied from the microcomputer (not shown) to control the delay amount of the delay circuit 21.

The delay circuit 21 is set in accordance with the control signal CN to shift a timing relation between the rising edge "a" of the horizontal synchronous signal H and the falling edge "e" of the phase-adjusted output clock CA in order to prevent the rising edge "a" of the horizontal synchronous signal H and the falling edge "e" of the phase-adjusted output clock CA from being coincident with each other in the character synthesizing circuit 3, thereby to remove a cause of the above mentioned fluctuation of the display character.

Figure 7B:
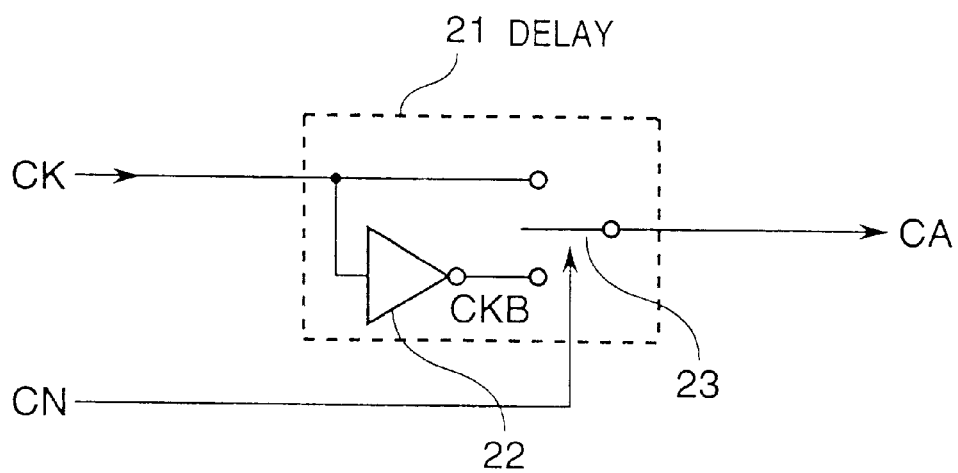
FIG. 7B is a circuit diagram of a delay circuit used as the phase adjusting circuit included in the OSD device shown in FIG. 5.

Referring to FIG. 7B, there is shown a circuit diagram of the delay circuit 21. The shown delay circuit 21 includes an inverter 22 receiving the OSD clock CK to generate an inverted clock CKB, and a selector, for example, a switch 23, receiving the OSD clock CK and the inverted clock CKB and controlled by the control signal CN to select either the OSD clock CK and the inverted clock CKB and to output the selected clock as the phase-adjusted output clock CA.

As mentioned above, since the purpose of the delay circuit 21 is to prevent the rising edge "a" of the horizontal synchronous signal H and the falling edge "e" of the phase-adjusted output clock CA from becoming coincident with each other in phase, it is sufficient if two different delay amounts are prepared. Therefore, the delay circuit 21 is sufficient if it can selectively output either the OSD clock CK having no delay or the inverted clock CKB having its phase shifted by 180 degrees.

In an ordinary operation, it is possible to use either the OSD clock CK having no delay or the inverted clock CKB. However, the coincidence between the rising edge "a" of the horizontal synchronous signal H and the falling edge "e" of the phase-adjusted output clock CA can be avoided by selecting the inverted clock CKB only when the rising edge "a" of the horizontal synchronous signal H and the falling edge "c" of the OSD clock CK are coincident with each other in phase because of the delay time of the programmable counter 13 of the PLL circuit 1.

As mentioned above, the OSD device in accordance with the present invention is characterized in that the OSD clock generating circuit includes the PLL circuit controlled to oscillate to generate the OSD clock signal phase-locked with a level transition point of the horizontal synchronous signal. Thus, the period of the clock signal follows the period of the input horizontal synchronous signal, with the result that the OSD character can be always displayed with the same size without being influenced by a change of the period of the horizontal synchronous signal.

The invention has thus been shown and described with reference to the specific embodiments. However, it should be noted that the present invention is in no way limited to the details of the illustrated structures but changes and modifications may be made within the scope of the appended claims.

What is claimed is:

1. An on-screen display (OSD) device comprising:
   a clock generating circuit for generating, in synchronism with a horizontal synchronous signal obtained from a composite video signal, an OSD clock signal for displaying an on-screen display which is an auxiliary display including a character to be added on a display screen based on said composite video signal, and
   an OSD synthesizing circuit receiving said OSD clock signal, said horizontal synchronous signal, a vertical synchronous signal obtained from said composite video signal, and a first control signal for generating an OSD display data,
   wherein said clock generating circuit includes a phase locked loop circuit controlled to oscillate to generate said OSD clock signal phase-locked with a level transition point of said horizontal synchronous signal; and
   wherein said phase locked loop circuit includes a phase comparing circuit receiving said horizontal synchronous signal and a frequency-divided signal to compare a level transition point of said horizontal synchronous signal and a level transition point of said frequency-divided signal for generating a phase difference signal, a filter receiving and smoothing said phase difference signal to generate an oscillation control signal, a voltage controlled oscillator receiving said oscillation control signal for generating said OSD clock signal having a frequency controlled by the voltage of said oscillation control signal, and a programmable counter receiving the OSD clock and programmed by a second control signal for frequency-dividing said OSD clock signal by a frequency-dividing ratio set by said second control signal so as to generate said frequency-divided signal.

2. An OSD device claimed in claim 1 further including a phase adjusting circuit receiving said OSD clock signal to output a phase-adjusted clock differing in phase from said level transition point of said horizontal synchronous signal, in place of said OSD clock signal, to said OSD synthesizing circuit.

3. An OSD device claimed in claim 2 wherein said phase adjusting circuit includes a delay circuit receiving said OSD clock signal and controlled by a third control signal to output said phase-adjusted clock by delaying said OSD clock signal by a delay time set by said third control signal.

4. An OSD device claimed in claim 3 wherein said delay circuit includes an inverter receiving said OSD clock signal for outputting an inverted OSD clock signal, and a selector receiving said OSD clock signal and said inverted OSD clock signal to output, as said phase-adjusted clock, a selected one of said OSD clock signal and said inverted OSD clock signal.

5. An on-screen display (OSD) device comprising:

a clock generating circuit for generating, in synchronism with a horizontal synchronous signal obtained from a composite video signal, an OSD clock signal for displaying an on-screen display which is an auxiliary display including a character to be added on a display screen based on said composite video signal, an OSD synthesizing circuit receiving said OSD clock signal, said horizontal synchronous signal, a vertical synchronous signal obtained from said composite video signal, and a first control signal for generating an OSD display data, and a phase adjusting circuit receiving said OSD clock signal to output a phase-adjusted clock differing in phase from said level transition point of said horizontal synchronous signal, in place of said OSD clock signal, to said OSD synthesizing circuit;

wherein said clock generating circuit includes a phase locked loop circuit controlled to oscillate to generate said OSD clock signal phase-locked with a level transition point of said horizontal synchronous signal; and wherein said phase adjusting circuit includes a delay circuit receiving said OSD clock signal and controlled by a third control signal to output said phase-adjusted clock by delaying said OSD clock signal by a delay time set by said third control signal.

6. An OSD device claimed in claim 5 wherein said delay circuit includes an inverter receiving said OSD clock signal for outputting an inverted OSD clock signal, and a selector receiving said OSD clock signal and said inverted OSD clock signal to output, as said phase-adjusted clock, a selected one of said OSD clock signal and said inverted OSD clock signal.

* * * * *